United States Patent
Engle

(10) Patent No.: US 10,055,696 B2
(45) Date of Patent: *Aug. 21, 2018

(54) SYSTEMS AND METHODS FOR GENERATING A DYNAMIC PERSONALIZED EVENTS FEED

(71) Applicant: STUBHUB, INC., San Francisco, CA (US)

(72) Inventor: Anselm David Engle, Oakland, CA (US)

(73) Assignee: STUBHUB, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/205,199

(22) Filed: Jul. 8, 2016

(65) Prior Publication Data

US 2016/0321570 A1 Nov. 3, 2016

Related U.S. Application Data

(63) Continuation of application No. 13/630,048, filed on Sep. 28, 2012, now Pat. No. 9,390,401.

(51) Int. Cl.
*G06Q 10/02* (2012.01)
*H04L 12/58* (2006.01)
(Continued)

(52) U.S. Cl.
CPC ......... *G06Q 10/02* (2013.01); *G06F 17/3089* (2013.01); *G06Q 10/10* (2013.01); *G06Q 50/01* (2013.01); *H04L 51/32* (2013.01); *H04N 21/25891* (2013.01); *H04N 21/2665* (2013.01); *H04N 21/2668* (2013.01); *H04N 21/4788* (2013.01); *H04N 21/47815* (2013.01); *H04N 7/24* (2013.01)

(58) Field of Classification Search
CPC ... H04L 41/142; H04L 51/32; G06Q 30/0207; G06Q 10/02; G06Q 10/10; G06Q 50/01
USPC ..... 709/203, 204, 206, 204.206; 705/5, 14.1
See application file for complete search history.

(56) References Cited

U.S. PATENT DOCUMENTS 7,206,755 B1 * 4/2007 Muralidhar ............ G06Q 10/02 235/382
7,454,361 B1 * 11/2008 Halavais ................ G06Q 10/02 705/5

(Continued)

*Primary Examiner* — Ranodhi Serrao
*Assistant Examiner* — James Fiorillo
(74) *Attorney, Agent, or Firm* — Shook, Hardy & Bacon L.L.P.

(57) ABSTRACT

A device and method for generating a dynamic personalized events feed that is personalized for a user is provided. The device may include one or more processors configured to determine events that match filtering information, generate the dynamic personalized events feed based on the determined events, and update the generated dynamic personalized events feed based on the determined events. The device may also include a network interface component coupled to a network, the network interface component configured to receive the filtering information, and transmit the generated dynamic personalized events feed to a user device. The device may further include a memory, the memory storing event information and user information for determining events that match the filtering information.

18 Claims, 7 Drawing Sheets

(51) Int. Cl.
*G06F 17/30* (2006.01)
*G06Q 50/00* (2012.01)
*G06Q 10/10* (2012.01)
*H04N 21/258* (2011.01)
*H04N 21/2665* (2011.01)
*H04N 21/2668* (2011.01)
*H04N 21/478* (2011.01)
*H04N 21/4788* (2011.01)
*H04N 7/24* (2011.01)

(56) References Cited

U.S. PATENT DOCUMENTS

| | | | | |
|---|---|---|---|---|
| 7,669,123 B2 * | 2/2010 | Zuckerberg | | G06F 17/30867 715/273 |
| 7,827,208 B2 * | 11/2010 | Bosworth | | G06F 17/3089 707/802 |
| 8,667,009 B2 * | 3/2014 | Voigt | | H04L 51/32 705/14.53 |
| 2007/0233736 A1 * | 10/2007 | Xiong | | G06Q 30/02 |
| 2008/0034030 A1 * | 2/2008 | Toohey | | G06Q 10/00 709/203 |
| 2008/0040370 A1 * | 2/2008 | Bosworth | | G06F 17/3089 |
| 2008/0040673 A1 * | 2/2008 | Zuckerberg | | G06F 17/30867 715/745 |
| 2008/0092160 A1 * | 4/2008 | Mortimore | | G06F 17/3089 725/34 |
| 2009/0276364 A1 * | 11/2009 | Iaia | | G06Q 10/02 705/80 |
| 2009/0325556 A1 * | 12/2009 | Lee | | G06F 17/30867 455/414.2 |
| 2010/0057682 A1 * | 3/2010 | Ramsay, Jr. | | G06Q 10/10 707/E17.014 |
| 2010/0281178 A1 * | 11/2010 | Sullivan | | H04N 7/24 709/231 |
| 2011/0093784 A1 * | 4/2011 | Kiraz | | G06F 17/30864 715/719 |
| 2011/0125829 A1 * | 5/2011 | Finley | | G06F 17/30867 709/203 |
| 2011/0282700 A1 * | 11/2011 | Cockcroft | | G06Q 10/02 705/5 |
| 2011/0289142 A1 * | 11/2011 | Whalin | | G06Q 10/10 709/203 |
| 2011/0307399 A1 * | 12/2011 | Holmes | | G06Q 30/02 705/319 |
| 2012/0078667 A1 * | 3/2012 | Denker | | G06Q 10/02 705/5 |
| 2012/0173310 A1 * | 7/2012 | Groetzinger | | G06Q 30/0207 705/14.1 |
| 2012/0185486 A1 * | 7/2012 | Voigt | | H04L 51/32 707/741 |
| 2012/0221362 A1 * | 8/2012 | Nezer | | G06Q 10/02 705/5 |
| 2012/0290950 A1 * | 11/2012 | Rapaport | | H04L 51/32 715/753 |
| 2013/0007133 A1 * | 1/2013 | Zuckerberg | | G06Q 30/02 709/204 |
| 2013/0036117 A1 * | 2/2013 | Fisher | | G06F 17/30029 707/736 |
| 2013/0054714 A1 * | 2/2013 | Bedi | | G06Q 10/10 709/206 |
| 2013/0061156 A1 * | 3/2013 | Olsen | | G06Q 50/01 715/753 |
| 2013/0124234 A1 * | 5/2013 | Nilsson | | G06Q 30/02 705/5 |
| 2013/0298030 A1 * | 11/2013 | Nahunni; Aaron | | H04W 4/04 715/733 |
| 2014/0222812 A1 * | 8/2014 | Voigt | | H04L 51/32 707/736 |
| 2014/0258191 A1 * | 9/2014 | Gubin | | G06Q 10/06393 706/12 |
| 2016/0173436 A1 * | 6/2016 | Koolwal | | H04L 51/32 709/206 |
| 2016/0191450 A1 * | 6/2016 | Lineberger | | H04L 51/32 709/206 |
| 2016/0378756 A1 * | 12/2016 | Kemp | | G06F 17/3051 707/722 |
| 2017/0103127 A1 * | 4/2017 | Hanson | | G06F 17/30864 |
| 2017/0134502 A1 * | 5/2017 | Griffin | | H04L 67/14 |

* cited by examiner

SYSTEMS AND METHODS FOR GENERATING A DYNAMIC PERSONALIZED EVENTS FEED

CROSS REFERENCE TO RELATED APPLICATIONS

The present application is a continuation of U.S. patent application Ser. No. 13/630,048, filed Sep. 28, 2012, which is hereby incorporated by reference in its entirety.

BACKGROUND

Technical Field

Embodiments disclosed herein are related to systems and methods for generating an events feed for viewing and use by a user. In particular, systems and methods disclosed herein may provide a dynamic personalized events feed that is populated with event entries that match filtering information provided by the user.

Related Art

Attending events is an inherently social experience. People are generally at a venue for the event with additional people who they may or may not know. The people attending the event may be there because they are fans of the band or actor or theatre troupe performing at the event, or they may be there attending with a friend or partner. One of the difficulties in attending events that are of interest is actually knowing about the event, including when it is happening, where the event will be happening, and what the event is. Searching for event information using the internet has lessened this difficulty, but it is often difficult for someone to know whether the event information is up to date. Further, once a person finds out about an event, they may have to search some more to find tickets or determine ticket availability. Moreover, due to the social nature of attending events, people may want to know if anyone from their social circles are attending these events, or what these people thought about the events. People may have to rely on information from other social websites to find out about this information, or rely on word of mouth recommendations. Social websites are updated based on content provided by users, so may not always have the information that a would-be event attendee would be looking for, or any information that could be available may not be up to date. Moreover, any new social network that relies on content provided by its users will inherently be empty as new users begin to join the network. Further, event attendees may not always know if any of their friends or contacts are attending events based on ordinarily provided event information.

Accordingly, there is a need for a system and method generating a dynamic personalized events feed that is automatically populated and updated to provide dynamic event information to a user. Such event information may include information about the event, where and how to purchase admission to the event, and indications of other users that have purchased admission to the event.

Figure 1:
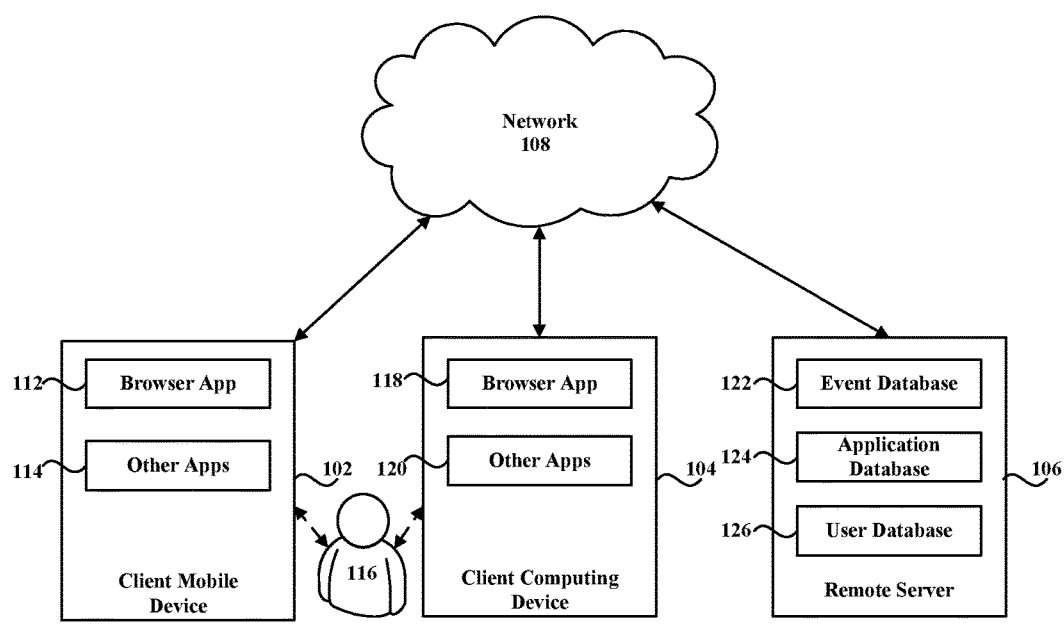
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided a device for generating a dynamic personalized events feed that is personalized for a user is provided. The device may include one or more processors configured to determine events that match filtering information, generate the dynamic personalized events feed based on the determined events, and update the generated dynamic personalized events feed based on the determined events. The device may also include a network interface component coupled to a network, the network interface component configured to receive the filtering information, and transmit the generated dynamic personalized events feed to a user device. The device may further include a memory, the memory storing event information and user information for determining events that match the filtering information.

Consistent with some embodiments, there is further provided a non-transitory computer-readable medium having instructions for execution by one or more processors that, when executed, cause the one or more processors to perform a method for generating a dynamic personalized events feed that is personalized for a user. The method may include steps of receiving filtering information, determining events that match the received filtering information, generating the dynamic personalized events feed based on the determined events, transmitting the dynamic personalized events feed for display on a user device, and updating the dynamic listing of events when new events also matching the received filtering information become available.

Consistent with some embodiments, there is further provided a method for generating a dynamic personalized events feed that is personalized for a user. The method includes receiving filtering information, wherein the filtering information comprises at least one of past events attended by the user, event-related searches performed by the user, a location of the user, events-related news, and a combination thereof. The method also includes determining events that match the received filtering information, generating the dynamic personalized events feed based on the determined events, transmitting the dynamic personalized events feed for display on a user device, and updating the dynamic listing of events when new events also matching the received filtering information become available. Consistent with some embodiments, the steps of the method may be performed by a remote server.

These and other embodiments will be described in further detail below with respect to the following figures.

FIG. 1 is a block diagram of a networked system 100, consistent with some embodiments. System 100 includes a client mobile device 102, a client computing device 104, and a remote server 106 in communication over a network 108. Remote server 106 may be an event, ticketing, or payment service provider server that may be maintained by an event, ticketing, or payment service provider, such as StubHub, Inc. of San Francisco, Calif., Zvents of San Francisco, Calif., eBay Inc. of San Jose, Calif., or PayPal, Inc. of San Jose, Calif. Server 106 may be maintained by other service providers in different embodiments. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client mobile device 102, in one embodiment, may be implemented using any appropriate combination of hardware and/or software configured for wired and/or wireless communication over network 108. For example, client mobile device 102 may be implemented as a wireless telephone (e.g., smart phone), tablet, personal digital assistant (PDA), notebook computer, and/or various other generally known types of wired and/or wireless mobile computing devices. Consistent with some embodiments, client mobile device 102 may include any appropriate combination of hardware and/or software having one or more processors and capable of reading instructions stored on a non-transitory machine-readable medium for execution by the one or more processors. Consistent with some embodiments, client mobile device 102 includes a machine-readable medium, such as a memory (not shown) that includes instructions for execution by one or more processors (not shown) for causing client mobile device 102 to perform specific tasks. For example, such instructions may include displaying content, such as a web page or a user interface using a browser 112. Further, content may be content displayed by particular applications or "apps" 114 stored in a memory of client mobile device 102 and executed by one or more processors executing in client mobile device 102. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Client mobile device 102 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Client mobile device 102 may also be a tablet computer, such as an iPad™ or other tablet computer running one of the aforementioned operating systems. It should be appreciated that, in various embodiments, client mobile device 102 may be referred to as a user device or a customer/client device without departing from the scope of the present disclosure.

Consistent with some embodiments, browser 112 may be a mobile browser app, which may be used to provide a user interface to permit a user 116 to browse information available over network 108. For example, browser application 112 may be implemented as a web browser to view information available over network 108. Browser application 112 may include a software program, such as a graphical user interface (GUI), executable by one or more processors that is configured to interface and communicate with the remote server 106 or other servers managed by content providers or merchants via network 108. For example, user 116 is able to use browser 112 or other applications 114 to browse upcoming events and purchase tickets for these events. User 116 may also be able to user browser 112 or other applications to access a personalized feed listing events matching predetermined criteria associated with user 116.

Client mobile device 102, in one embodiment, may include other applications 114 as may be desired in one or more embodiments to provide additional features available to user 116, including accessing a personalized feed listing events matching predetermined criteria associated with user 116 or browsing upcoming events and purchasing tickets for these events. For example, applications 114 may include interfaces and communication protocols that allow the user to receive and transmit information through network 108 and to remote server 106 and other online sites. Applications 114 may also include security applications for implementing client-side security features, programmatic client applications for interfacing with appropriate application programming interfaces (APIs) over network 108 or various other types of generally known programs and/or applications. Applications 114 may include mobile apps downloaded and resident on client mobile device 102 that enables user 116 to access content through the apps.

Client computing device 104, which can be similar to client mobile device 102, may be a separate device, such as a PC or laptop or netbook, or may be omitted if the user will be using only client mobile device 102. Both user devices may be used to access content with remote server 106 or other content provider. Client computing device 104, in one embodiment, may include a browser application 118 and other applications 120, similar to browser application 112 and applications 114 in client mobile device 102. Browser application 118 and applications 120 enable user 116 to communicate with remote server 106 to, among other things, access a personalized feed listing events matching predetermined criteria associated with user 116, as well as other online sites.

Remote server 106 according to some embodiments, may be maintained by an online be an event, ticketing, or payment service provider server. Remote server 106 may include at least event database 122, which maintains a database of events. Remote server 106 may also include an application database 124 for storing various applications for interacting with client mobile device 102 and client computing device 104 over network 108. Such applications may include applications for authentication, conducting financial transactions, shopping and purchasing items, finding and purchasing tickets for events, and creating a personalized event feed based on predetermined criteria associated with user 116. Remote server 106 may also include a user database 126 that may store information about user 116 such as past searches, past purchases, and user-defined criteria. User database 126 may store information about multiple users that may be shared amongst the users according to each user's preference. For example, information pertaining to user 116 may be shared with another user for creating a personalized event feed for the other user if the other user decides that they have a similar taste in events that user 116 does.

Figure 2:
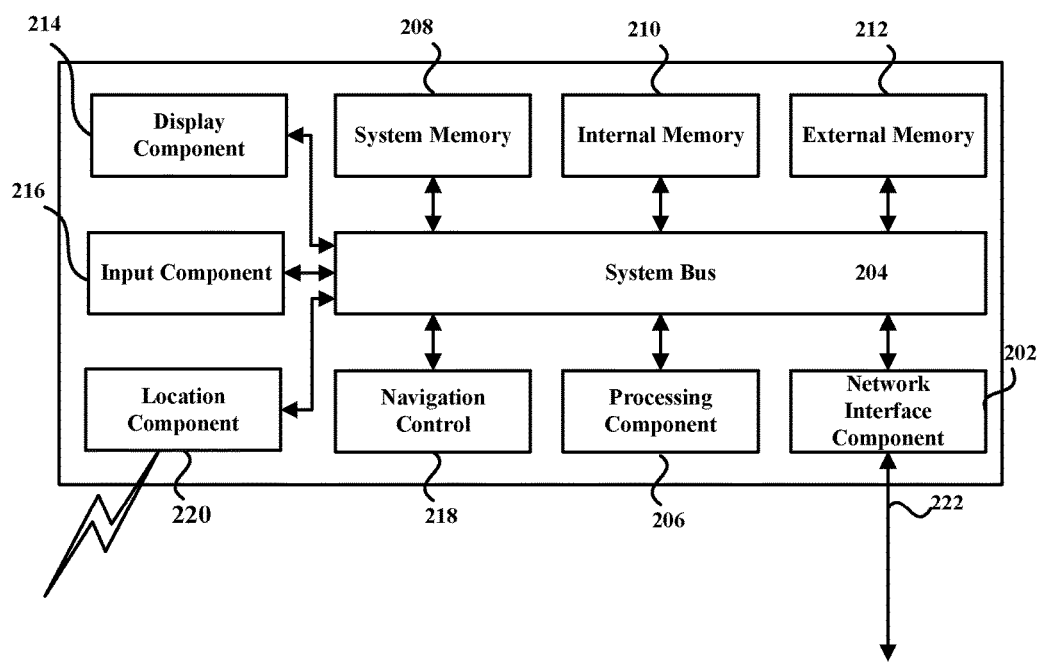
FIG. 2 is a diagram illustrating a computing system, consistent with some embodiments.

FIG. 2 is a diagram illustrating computing system 200, which may correspond to any of client mobile device 102, client computing device 104, or remote server 106, consistent with some embodiments. Computing system 200 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™, as would be consistent with client mobile device 102. Computing system 200 may also be a tablet computer such as the iPad™ or other similar device running the aforementioned operating systems. Computing system 200 may also be a personal computer, laptop computer, netbook, or tablet computer as would be consistent with client computing device 104. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), a system memory component 208, which may correspond to random access memory (RAM), an internal memory component 210, which may correspond to read-only memory (ROM), and a external or static memory 212, which may correspond to optical, magnetic, or solid-state memories. Consistent with some embodiments, computing system 200 further includes a display component 214 for displaying information to a user 116 of computing system 200. Display component 214 may be an liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 116 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Consistent with some embodiments, computing system 200 may include a location component 220 for determining a location of computing system 200. In some embodiments, location component 220 may correspond to a global positioning system (GPS) transceiver that is in communication with a satellite. In other embodiments, location component 220 may be configured to determine a location of computing system by using an internet protocol (IP) address lookup, or by triangulating a position based on nearby mobile communications towers. Location component 220 may be further configured to store a user-defined location in any of system memory 208, internal memory 210, and/or external memory 212 that can be transmitted to a third party for the purpose of identifying a location of computing system 200. Consistent with some embodiments, the location of computing system 200 may be used by computing system 200 or remote server 106 for the purpose of providing user 116 a feed or listing of events that are near the location of computing system 200.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202. Communication link 222 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 222. Received program code may be executed by processing component 206 as received and/or stored in memory 208, 210, or 212.

Figure 3A:
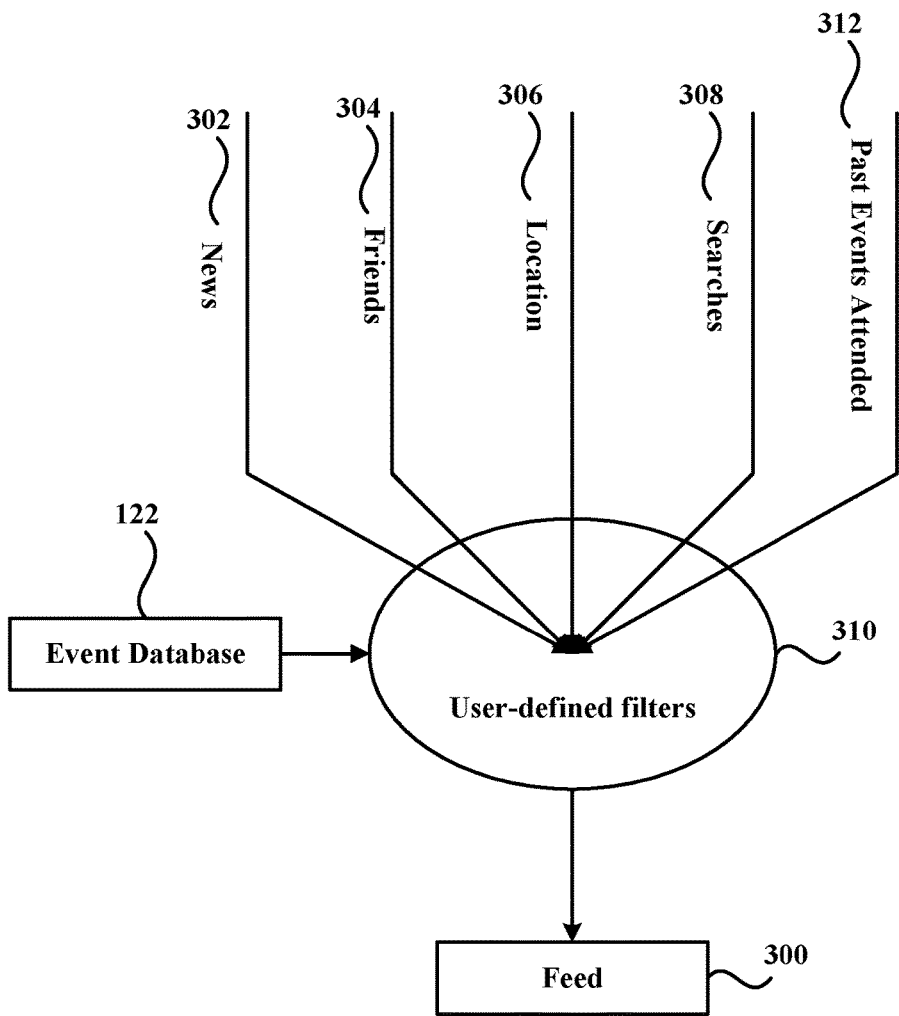
FIG. 3A is a diagram illustrating generating a dynamic personalized event feed, consistent with some embodiments.
Figure 3B:
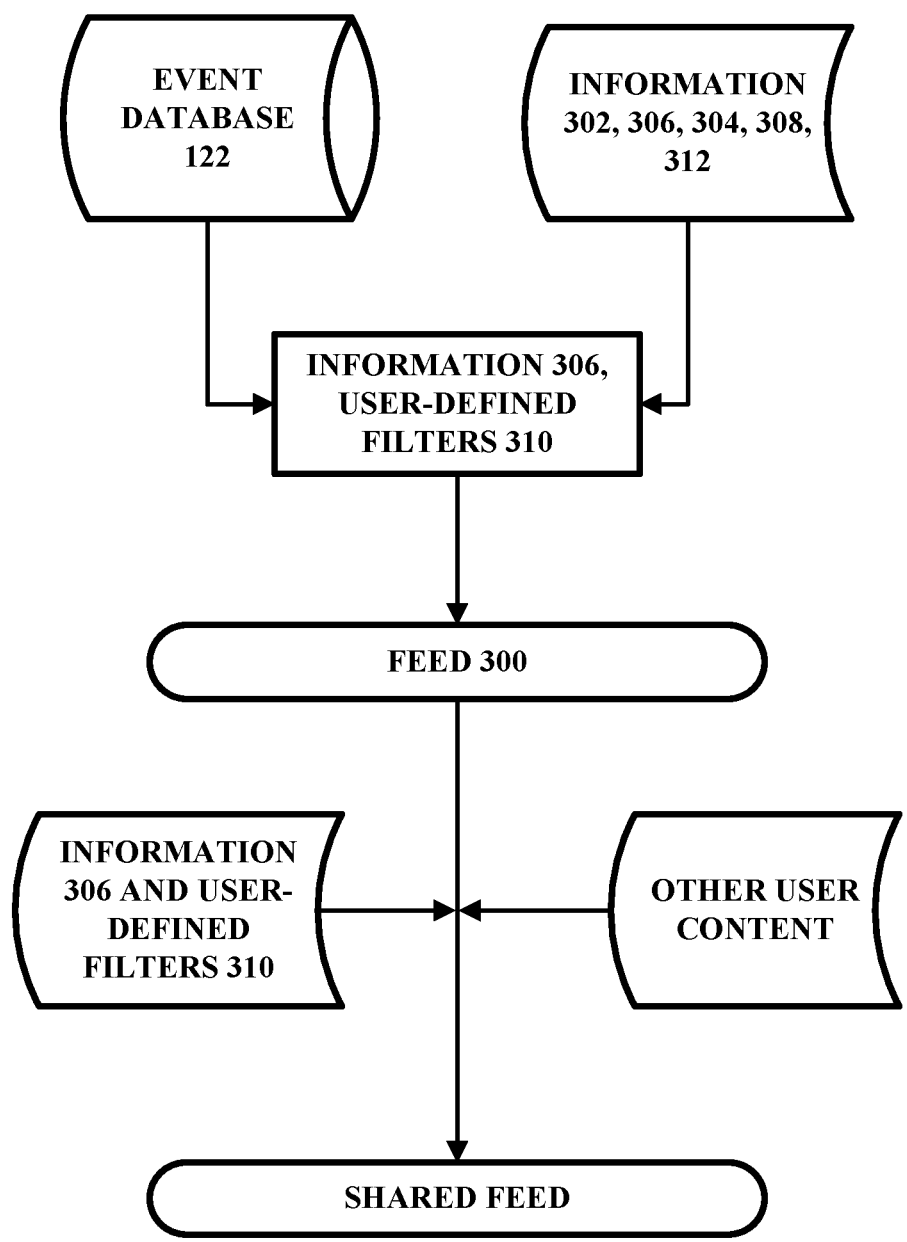
FIG. 3B is a diagram illustrating the generation of a dynamic personalized event feed that may be shared with other users, consistent with some embodiments.
Figure 4:
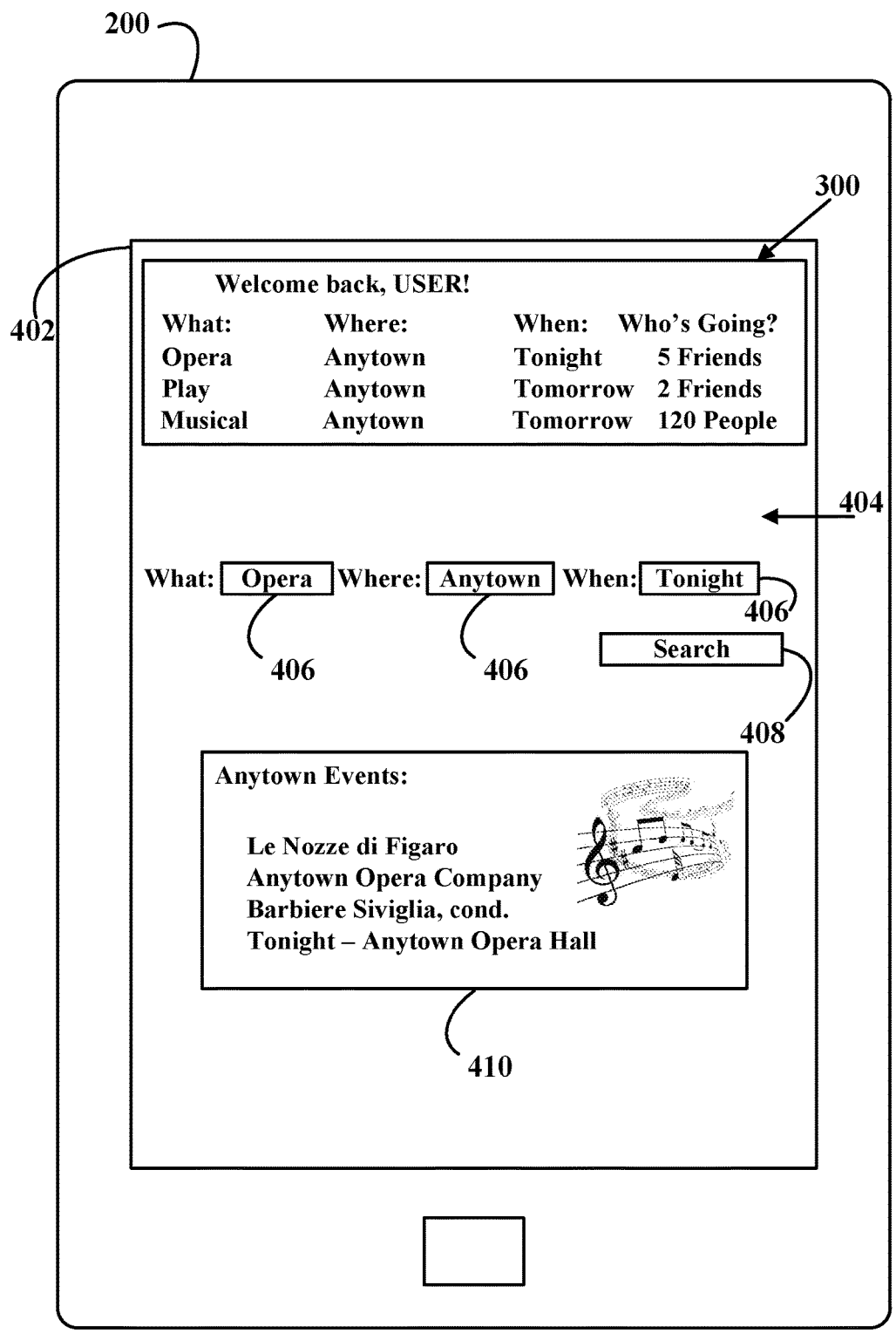
FIG. 4 is a diagram illustrating a user interface having a dynamic personalized events feed, consistent with some embodiments.

FIG. 3A is a diagram illustrating generating a dynamic personalized event feed 300, consistent with some embodiments. Consistent with some embodiments, feed 300 is a feed that is generated for viewing by user 116. However, feed 300 may also be a feed that is generated by user 116 for sharing to other users, as is shown in FIG. 3B. As shown in FIG. 3A, different filtering information may be used to generate a dynamic personalized events feed 300. Feed 300 may be populated using the different inputs by a feed generation application in application database 124. For example, news 302 about upcoming events or newly announced events may be used to populate feed 300. News 302 may also include news about canceled events so that events that have been canceled may be removed from feed 300. Information about other users designated as "Friends" 304 may also be used to populate feed 300. While the term "Friend" is used, this term may be generally applicable to other users that user 116 has connected with in some way that is recognized by remote server 106. Friend information 304 may include the preferences, likes, and tastes of friends, events that friends have attended or are attending, or information from a friend's feed. Location 306 may be used to populate feed 300. For example, user 116 may indicate a location at which user 116 prefers to attend event. The location could be a venue, city, or area. Location 306 may also be automatically determined using location component 220 and provided to remote server 106 for use by a feed generation application in application database 124. Saved searches 308 may also be used to generate feed 300. For example, as shown in FIG. 4, if a user searches for Opera in Anytown, the feed generation application may understand that user 116 likes opera, and is in or around Anytown, and can use this information to populate feed 300. Consistent with some embodiments, user 116 may indicate, as part of user-defined filters 310, whether feed generation application is permitted to use searches. Past events attended 312 may also be used to generate feed 300. If user 116 has previously attended an opera, that information may be stored in user database 126 and may be used as a positive indication that user 116 may be interested in other opera events, or events similar to opera. If user 116 has previously attended an event performed by a particular band, that information may be stored in user database 126 and may be used to find other similar bands that have upcoming events. User-defined filters 310 may also be used to generate feed 300. User-defined filters 310 may include information such as types of events or genres of events that are of interest to user 116, such as "Theatre" or "Opera" or "Live Music at Outdoor Venue". In general, user-defined filters 310 may be a baseline from which feed 300 may be generated, with information 302, 304, 306, 308, and 312 refining feed 300. According to some embodiments, information 302, 304, 306, 308, and 312 may be stacked such that individual information 302, 304, 306, 308, and 312 may be filtered using only information from one of information 302, 304, 306, 308, and 312. For example, news information 302 may be filtered by location information 304, and so on. User-defined filters 310 may also include information as to what to include and exclude from information 302, 304, 306, 308, and 312. For example, user 116 may not want location 306 and saved searches 308 being used in generating feed 300. The feed generation application of application database 124 receives event information from event database 122 and applies inputs from information 302, 304, 306, 308, 312, and user-defined filters 310 to generate feed 300 with events that match one or more of the filtering information. According to some embodiments, the generation of feed 300 is performed by processing component 206 on remote server 106, and feed 300 is then transmitted to client mobile device 102 or client computing device 104 for display on display component 214. However, the generation of feed 300 may be performed locally by processing component 206 of client mobile device 102 or client computing device 104 using a feed generation application included in other apps 114 or 120, using event information received from event database 122 and/or user information from user database 126.

FIG. 3B is a diagram illustrating the generation of a dynamic personalized event feed that may be shared with other users, consistent with some embodiments. As shown in FIG. 3B, feed 300 may be generated by receiving information 302, 304, 308, 312, and events from event database 122 and applying user-defined filters 310, as discussed above in FIG. 3A. As further discussed above with respect to FIG. 3A, the information may be stacked such that they can be used as additional filters, such as location information 306. A shared feed, for example, one that may be available to other users or implemented as a widget or accessed through a hyperlink may be further tailored to the preferences of user 116. As shown in FIG. 3B, a shared feed may be generated by taking feed 300 and then further filtering the events that make up feed 300 using location information 306 (or other information 302, 304, 308, and 312), and user-defined filters 310 and other content or information added or flagged by user 116. Based on these inputs and filters, a shared feed that user 116 has specifically tailored for sharing may be created and then shared with other users as a widget, application, or hyperlink.

FIG. 4 is a diagram illustrating a user interface having a dynamic personalized events feed, consistent with some embodiments. As shown in FIG. 4, computing system 200 includes a display 402 that displays a user interface 404 that includes dynamic personalized events feed 300. Consistent with some embodiments, display 402 may be displayed by display component 214. Moreover, user 116 may interact with user interface 404 using input component 216 and/or navigation control 218. User interface may also include one or more form fields 406 for inputting a search. The search may be an event search, wherein the information placed into form fields 406 are transmitted to remote server 106 over network when user 116 selects Search button 408. The information in form fields 406 may then be matched to event information stored in event database 122, and the matching events are transmitted back to client mobile device 102 or client computing device 104 over network where the matching events are displayed in user interface 404. Form fields 406 may include search parameters such as "What", "Where", and "When". Form fields 406 may include additional or less search parameters. User interface 404 may also include a results box 410 that may display results of a search, wherein results box 408 displays one or more matching events. Results box 410 may display additional information such as ticket information, reviews, and alternative dates.

As discussed above, user interface 404 includes a dynamic personalized events feed 300. Dynamic personalized events feed 300 may display a listing of events that match filtering information provided by user 116 or relative to user 116, as discussed above in FIG. 3A. For example, user 116 may be using user interface 404 for the first time, and performs a search for an Opera in Anytown for Tonight. As a result of the search, which corresponds to saved searches information 308, dynamic personalized events feed 300 may automatically populate with events that match or are similar to the input search parameters. The next time, user 116 accesses user interface 404 with dynamic personalized events feed 300, feed 300 will be updated to reflect more recent events that are similar to the previous search or other filtering information. Because feed 300 is dynamic, it may always be populated with the most recent events of interest to user 116.

Consistent with some embodiments, when user 116 purchases a ticket for a listed event, user database 126 and/or event database 122 may be updated to indicate that user 116 has purchased a ticket and will be attending the event. Consequently, this purchase will be included as past events attended filtering information 312. Moreover, feed 300 use the past events information 312 of many users to update event information in event database 122 with a listing of who is attending the event. For example, feed 300 may show a total number of people attending the event, or may show other user designated by user 116 as "friends" or "colleagues" or other designation designed to connect user 116 to other users. According to some embodiments, remote server 106 may being coupled to a third party ticketing database (not shown) that provides real-time or near-real-time updates of how many people are attending an event or how many tickets remain for the event. The information provided to user 116 in feed 300 may be tailored to display information that is of interest to user 116 based on user preferences indicated in user settings and may be dynamically updated to provide user 116 with a up-to-date and active feed with current and upcoming events of interest to user 116, as discussed above in FIG. 3A.

Consistent with some embodiments, feed 300 may be embodied as an application that resides in memory 208, 210, or 212 of computing system 200 and is executed by processing device 206. Feed 300 may also be embodied as a widget that is stored in memory 208, 210, or 212 of computing system 200 and executed by processing device 206. The widget or application embodying feed 300 may be implemented on user interfaces other than user interface 404. For example, feed 300 may be an application or widget that is usable by a social media platform, such as Facebook™, Google+™, or Twitter™, such that feed 300 of user 116 may be displayed when user 116 accesses these social media platforms or displayed by other users associated with user 116 on these social media platforms.

Figure 5:
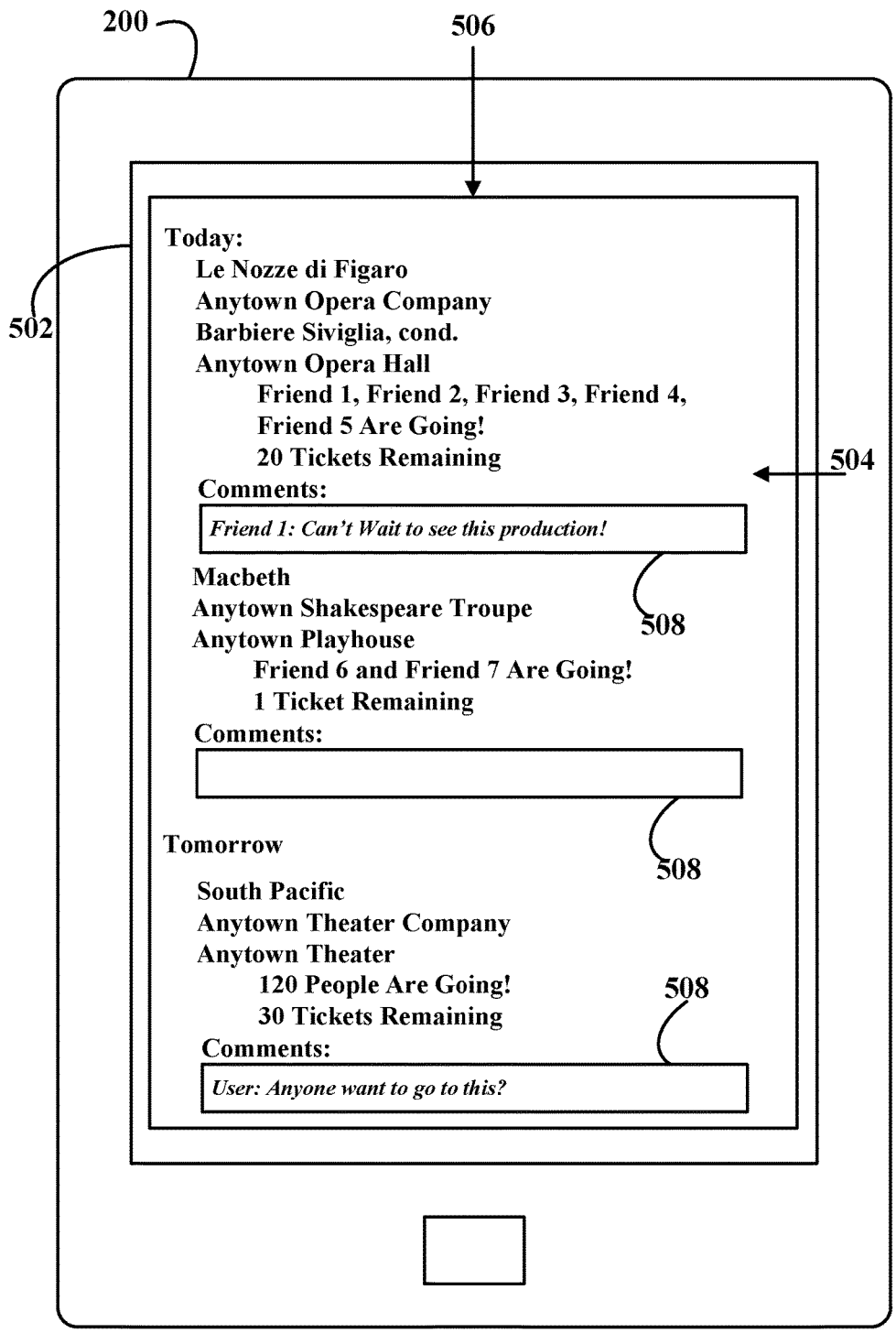
FIG. 5 is a diagram illustrating a user interface with a dynamic personalized events feed, consistent with some embodiments.

FIG. 5 is a diagram illustrating a user interface with a dynamic personalized events feed, consistent with some embodiments. As shown in FIG. 5, computing system 200 includes a display 502 that displays a user interface 504 that includes a dynamic personalized events feed 506. Dynamic personalized events feed 506 is similar to feed 300 shown in FIG. 4, but is designed to be the main focus of user interface 504 and provides additional details not instantly shown in feed 300. Consistent with some embodiments, the information shown in feed 506 may be accessed by selecting an event listed on feed 300. Returning to FIG. 5, feed 506 may display event information that includes the names of any of user 116's friends that have bought tickets to the event, the number of tickets remaining (if such information is available). User 116 may be able to select a hyperlink associated with the number of tickets remaining to be taken to a website maintained by a ticketing provider, such as StubHub, Inc. of San Francisco, Calif., Zvents of San Francisco, Calif., or eBay Inc. of San Jose, Calif. Feed 506 may include a form field 508 for the entry of comments. Consistent with some embodiments, user 116 may enter comments in field 508 that may be read by friends of user 116 or by anyone viewing event according to preferences selected by user 116. Similarly, user 116 may be able to read comments that have been entered by friends and/or other users. Comments, instead of text, may be indications of preference for an event, similar to a like or +1 used by other social media platforms, according to some embodiments.

User 116 may be able to share or export individual entries from feed 506, or the entire feed 506. For example, user 116 may be able to share an event or feed 506 with a friend or other user so that the friend or other user may be able to view the event or feed 506. The event or feed 406 may be shared as a hyperlink, or as an e-mail or other message. The event or feed 506 may be exported as an application or widget for use on other sites, as discussed previously. Consistent with some embodiments, sharing a feed with another user, or receiving another user's feed may create additional characteristics to be used in populating feed 506. Consistent with some embodiments, feed 506 or feed 300 may also include accommodation, travel, or merchandise information related to each of the event entries. Metadata associated with the event entry may be analyzed to find information about the event, and this metadata may be used to find related accommodation, travel, or merchandise by searching the metadata information on the servers of providers of accommodation, travel, or merchandise. In some embodiments, metadata associated with the event entry may be used to display accommodation, travel, or merchandise that is available for purchase from a provider such as eBay Inc. of San Jose, Calif.

Figure 6:
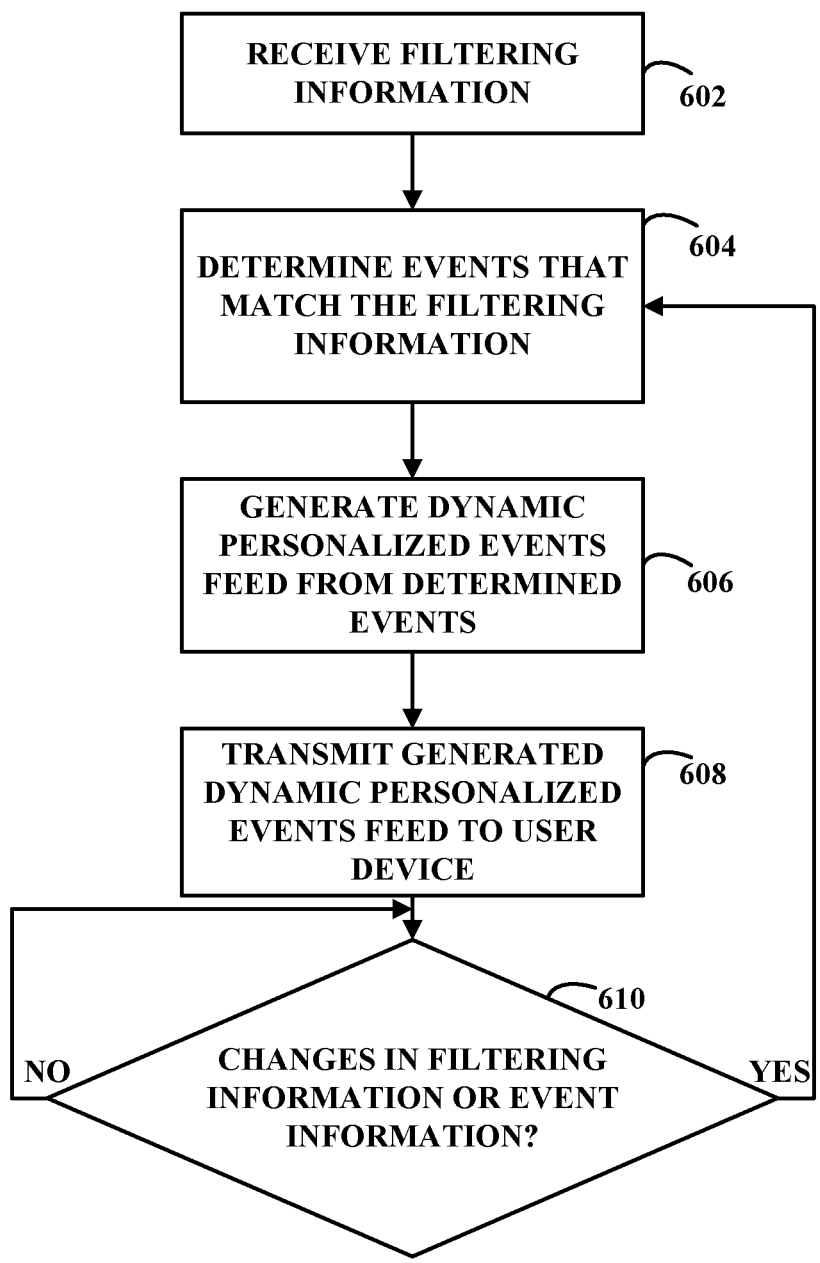
FIG. 6 is a flowchart illustrating a method for generating a dynamic personalized events feed, consistent with some embodiments.

FIG. 6 is a flowchart illustrating a method for generating a dynamic personalized events feed, consistent with some embodiments. For the purpose of illustration, FIG. 6 will be described with reference to FIGS. 1, 2, 3A, 3B, 4, and 5. The method shown in FIG. 6 may be embodied in computer-readable instructions for execution by one or more processors in processing component 206 such that the steps of the method may be performed by remote server 106. As shown in FIG. 6, remote server may receive filtering information (602). The filtering information may be received from user 116 using client mobile device 102 or client computing device 104 and may be transmitted over network 108. In some embodiments, the filtering information is received by a feed generation application in application database 124 from at least one of event database 122 or user database 126. Filtering information may include at least one of event news information 302, friend information 304, location information 306, saved search information 308, and past events attended information 312. The received filtering information may also include any user-defined filters 310. Based on the received filtering information, events are matched to the filtering information (604). Consistent with some embodiments, processing component 206 will perform a matching algorithm to match events stored in event database 122 with the received filtering information. The match may be a full match or a partial match. Moreover, the match may be based on a scoring algorithm, wherein events are scored based on how much of the received filtering information they match. From the determined events, processing component 206 may then generate a dynamic personalized events feed 300 or 506 (606). The generated dynamic personalized events feed may then be transmitted to a user device (608). Consistent with some embodiments, the user device may correspond to client computing device 104 or client mobile device 102. Further, the dynamic personalized events feed 300 or 506 may be transmitted to client mobile device 102 or client computing device 104 from remote server 106 over network 108 using network interface component 202. The generated dynamic personalized events feed 300 or 506 may be displayed on display component 214, and may include entries for each event, such as shown in FIGS. 4 and 5. According to some embodiments, user 116 may issue a command to remote server 106 to share or export the generated dynamic personalized events feed 300 or 506, or individual event entries of feed 300 or 506 to other users. Moreover, as discussed above, feed 300 or 506 may be implemented as a widget or a stand-alone application which can be embedded into websites for viewing by other users. Consequently, feed 300 or 506 may also be transmitted to these other users when the user accesses the websites having the widget or application embedded therein. Further, one or more other users may be interested in subscribing to feed 300 or 506 of user 116 and may subscribe to feed 300 or 506 such that feed 300 or 506 is transmitted to the one or more subscribers when a request to access feed 300 or 506 is made.

Returning to FIG. 6, after feed 300 or 506 has been initially generated, processing component 206 of remote server 106 may perform checks to determine if there are changes in filtering information or event information (610). Changes in filtering information may include new or additional filtering information entered by user 116. For example, if user 116 is traveling, user 116 may want to update location information 306 to include their destination. Changes in event information may include updates made to event database 122 to reflect canceled events, new events, changes in event information, and/or comments or ticket information related to an event. If changes are made, the dynamic personalized events feed is updated by determining events based on the changed event information that also match the changed filtering information (604). As a result, user 116 may be provided with a dynamic events feed that is personalized based on filtering information that is continuously updated with new events that may be of interest to user 116. Although the method shown in FIG. 6 is described as being performed by remote server 106, the method may also be performed locally by client mobile device 102 or client computing device 104 using event information from event database 122 and/or user information from user database 126.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices that generate a dynamic personalized events feed. In particular, embodiments as described herein may provide a dynamic, updated, event feed based tailored to a user's own interests that is dynamically updated to always provide the user with up-to-date and relevant event information. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method, comprising:
accessing a plurality of ticket-based events from a first input comprising a database;
generating for a first user, an event feed including one or more ticket-based events of the plurality of ticket-based events by filtering the plurality of ticket-based events based on information about the first user, wherein the information about the first user comprises at least a past ticket-based event attended by the first user, and wherein filtering the plurality of ticket-based events based on a past ticket-based event comprises including in the event feed at least one upcoming event that has at least one similarity to the past ticket-based event;
including in the event feed information from a second input stacked to filter the second input using information from a third input, wherein the information from the second input comprises at least one of news regarding the plurality of ticket-based events or notifications of other users planning to attend at least one of the plurality of ticket based event, and
wherein the information from the third input comprises at least one of an automatically determined current location of the first user, types of ticket-based events the first user is interested in attending, or past searches regarding the plurality of ticket-based events conducted by the first user;
causing the event feed to be displayed on an electronic device of the first user;
receiving a request from the first user to share the event feed with a second user;
sharing the event feed with the second user in response to the received request, wherein the sharing comprises causing the event feed to be displayed on an electronic device of the second user;
receiving a request from the first user to electronically re-access the event feed; and
updating, in response to the request, the event feed to reflect new events, changes to one or more existing events, or canceled events since the event feed was generated.

2. The method of claim 1, wherein the generating the event feed comprises: displaying an automatically generated notification as a part of the event feed, the notification notifying the first user that a third user is planning on attending a first ticket-based event, the third user being associated with the first user through a social network.

3. The method of claim 2, wherein the displaying the notification comprises: displaying a confirmation notifying the first user that the third user has purchased a ticket to the first ticket-based event.

4. The method of claim 2, wherein the generating the event feed further comprises: displaying ticketing information notifying the first user about the first ticket-based event the third user is planning to attend.

5. The method of claim 1, wherein the second input comprises news regarding the plurality of ticket-based events and the third input comprises types of ticket-based events the first user is interested in attending.

6. The method of claim 1, wherein the information about the first user and the third input comprise an automatically determined current location of the first user.

7. The method of claim 1, wherein the third input comprises past searches regarding the plurality of ticket-based events conducted by the first user.

8. The method of claim 1, wherein the information about the first user comprises a past ticket-based event performed by a particular band and attended by the first user, and wherein filtering the plurality of ticket-based events based on the past ticket-based event comprises including in the event feed at least one upcoming event associated with a similar band.

9. The method of claim 1, wherein the information about the first user comprises a past ticket-based event of a particular genre attended by the first user, and wherein filtering the plurality of ticket-based events based on the past ticket-based event comprises including in the event feed at least one upcoming event in the same genre.

10. The method of claim 1, wherein the second input comprises information about a third user being associated with the first user through a social network.

11. A system, comprising: a non-transitory memory; and one or more hardware processors coupled to the non-transitory memory and configured to read instructions from the non-transitory memory to cause the system to perform operations comprising:
accessing a plurality of ticket-based events from a database;
generating an event feed including one or more ticket-based events of the plurality of ticket-based events by filtering the plurality of ticket-based events based on at least an input from a first user, wherein the input comprises an automatically determined current location of the first user to facilitate including events from the plurality of ticket-based events based on the current location;
including in the event feed information from a second input stacked to filter the second input using information from a third input, wherein the information from the second input comprises at least one of news regarding the plurality of ticket-based events or notifications of other users planning to attend at least one of the plurality of ticket based event; and
wherein the information from the third input comprises at least a past ticket-based event attended by the first user, and wherein filtering the plurality of ticket-based events based on a past ticket-based event comprises including in the event feed at least one upcoming event that has at least one similarity to the past ticket-based event;
causing the event feed to be displayed on an electronic device of the first user;
receiving a first request from the first user to share the event feed with a second user;
sharing the event feed with the second user in response to the first request, wherein the sharing comprises causing the event feed to be displayed on an electronic device of the second user;
receiving a second request from the first user to electronically re-access the event feed; and updating, in response to the second request, the event feed to reflect new events, changes to one or more existing events, or canceled events since the event feed was generated.

12. The system of claim 11, wherein the generating the event feed comprises: displaying an automatically generated notification as a part of the event feed, the notification notifying the first user that a third user is planning on attending a first ticket-based event, the third user being associated with the first user through a social network.

13. The system of claim 12, wherein the displaying the notification comprises: displaying a confirmation notifying the first user that the third user has purchased a ticket to the first ticket-based event.

14. The system of claim 12, wherein the generating the event feed further comprises: displaying ticketing information notifying the first user about the first ticket-based event the third user is planning to attend.

15. The system of claim 11, wherein the input from the first user is selected from a group consisting of: types of ticket-based events, news regarding the plurality of ticket-based events, preferred locations for the plurality of ticket-based events, a current location of the first user, other users who are associated with the plurality of ticket-based events, searches regarding the plurality of ticket-based events conducted by the first user, and past ticket-based events attended by the first user.

16. A non-transitory machine-readable medium having stored thereon machine-readable instructions executable to cause a machine to perform operations comprising:
accessing a plurality of ticket-based events from a database;
generating for a first user, an event feed including one or more ticket-based events of the plurality of ticket-based events by filtering the plurality of ticket-based events based, at least in part, on information about the first user, wherein the information about the first user comprises at least a past ticket-based event attended by the first user, and wherein filtering the plurality of ticket-based events based on a past ticket-based event comprises including in the event feed at least one upcoming event that has at least one similarity to the past ticket-based event;
including in the event feed information from a second input stacked to filter the second input using the information from a third input, wherein the information from the second input comprises at least one of news regarding the plurality of ticket-based events or notifications of other users planning to attend at least one of the plurality of ticket based events, and
wherein the information from the third input comprises at least one of an automatically determined current location of the first user, types of ticket-based events the first user is interested in attending, or past searches regarding the plurality of ticket-based events conducted by the first user;
causing the event feed to be displayed on an electronic device of the first user;
receiving a request from the first user to share the event feed with a second user;
sharing the event feed with the second user in response to the received request, wherein the sharing comprises causing the event feed to be displayed on an electronic device of the second user;
receiving a request from the first user to electronically re-access the event feed; and updating, in response to the request, the event feed to reflect new events, changes to one or more existing events, or canceled events since the event feed was generated.

17. The non-transitory machine-readable medium of claim 16, wherein the input from the first user is selected from the group consisting of: types of ticket-based events, news regarding the plurality of ticket-based events, preferred locations for the plurality of ticket-based events, a current location of the first user, other users who are associated with the plurality of ticket-based events, searches regarding the plurality of ticket-based events conducted by the first user, and past ticket-based events attended by the first user.

18. The non-transitory machine-readable medium of claim 16, wherein the generating the event feed comprises:
 displaying, as a part of the event feed, a confirmation notifying the first user that a third user has purchased a ticket to a first ticket-based event, the third user being associated with the first user through a social network; and
 displaying additional ticketing information regarding the first ticket-based event.

\* \* \* \* \*